(12) United States Patent
Elliott

(10) Patent No.: US 7,359,512 B1
(45) Date of Patent: Apr. 15, 2008

(54) AUTHENTICATION IN A QUANTUM CRYPTOGRAPHIC SYSTEM

(75) Inventor: Brig Barnum Elliott, Arlington, MA (US)

(73) Assignees: Verizon Corporate Services Group Inc., Basking Ridge, NJ (US); BBN Technologies LLC, Cambridge, MA (US)

(*) Notice: Subject to any disclaimer, the term of this patent is extended or adjusted under 35 U.S.C. 154(b) by 807 days.

(21) Appl. No.: 10/797,849

(22) Filed: Mar. 10, 2004

(51) Int. Cl.
  *H04L 9/00* (2006.01)
(52) U.S. Cl. .................... 380/253; 380/263
(58) Field of Classification Search ................ 380/263
  See application file for complete search history.

(56) References Cited

U.S. PATENT DOCUMENTS

| 7,035,411 | B2* | 4/2006 | Azuma et al. .............. 380/256 |
| 7,243,226 | B2* | 7/2007 | Newcombe et al. ........ 713/155 |
| 2004/0151321 | A1* | 8/2004 | Lutkenhaus ................ 380/278 |

OTHER PUBLICATIONS

G.A. Barbosa et al.: "Secure Communication Using Mesoscopic Coherent States," Northwestern University, Evanston, IL, Apr. 17. 2003, pp. 1-4.
G.A. Barbosa et al.: "Secure Communication Using Coherent States," in Quantum Communication, Measurement, and Computing (QCMC'02), Rinton Press, New Jersey, 2002, pp. 1-3.
Frederic Grosshans et al.: "Quantum key distribution using gaussian-modulated coherent states," 2003 Nature Publishing Group, vol. 421, Jan. 16, 2003, pp. 238-241.

* cited by examiner

*Primary Examiner*—Gilberto Barrón, Jr.
*Assistant Examiner*—Jung Kim

(57) ABSTRACT

A quantum cryptographic device provides authentication services over the optical (quantum) channel and the public channel. In one implementation, polarizers generate optical pulses that have a polarization state based on a bit from a first bit sequence. A polarization rotator further rotates the polarization basis of the optical pulse by a rotation angle specified by one or more bits of a second bit sequence. A receiving device receives the modulated optical pulses, demodulates the pulses, and may determine whether the optical channel can be authenticated. In an alternate implementation, phase modulation, instead of polarization modulation, is used to similarly modulate the optical pulses.

41 Claims, 10 Drawing Sheets

AUTHENTICATION IN A QUANTUM CRYPTOGRAPHIC SYSTEM

GOVERNMENT CONTRACT

The U.S. Government has a paid-up license in this invention and the right in limited circumstances to require the patent owner to license others on reasonable terms as provided for by the terms of (contract No. F30602-01-C-0170) awarded by DARPA.

FIELD OF THE INVENTION

The present invention relates generally to quantum cryptography, and more particularly, to authentication in quantum cryptographic systems.

DESCRIPTION OF RELATED ART

Cryptography is the art of rendering a message unintelligible to any unauthorized party. To achieve this goal, an algorithm (also called a cryptosystem or cipher) is used to combine a message with some additional piece of information known as a "key" to produce a cryptogram. This technique is known as "encryption." For a cryptosystem to be secure, it should be impossible to unlock the cryptogram without the key.

Two parties (hereinafter called "Alice" and "Bob") that wish to communicate using conventional cryptographic techniques may begin by agreeing on a key to use with the cipher. If Alice and Bob were previously able to communicate over a secure channel, they may have securely agreed on a key to use in their future communications over unsecure channels. More generally, however, this may not be possible or practical, and Alice and Bob may desire to agree on a cryptographic key over an unsecure channel. In these situations, Alice and Bob need a technique for exchanging keys in which a potential eavesdropper, called Eve, is not able to also learn the key.

Quantum cryptography is one known technique in which two users communicating over an unsecure communication channel can create a body of shared and secret information. This information may take the form of a random string of bits, which can then be used as a conventional secret key for secure communication. The advantage of quantum mechanical cryptography or quantum cryptography over traditional key exchange methods is that the exchange of information can be shown to be very secure, without making assumptions about the intractability of certain mathematical problems. Even when assuming hypothetical eavesdroppers with unlimited computing power, the laws of physics guarantee (probabilistically) that the secret key exchange will be secure.

One well known quantum key distribution scheme involves a quantum channel, through which Alice and Bob send keys using polarized photons, and a public channel, through which Alice and Bob send ordinary messages. The quantum channel is a transmission medium that isolates the polarized photons from interaction with the environment. The public channel may comprise a channel on any type of communication network such as a Public Switched Telephone network, the Internet, or a wireless network. An eavesdropper, Eve, may attempt to measure the photons on the quantum channel. Such eavesdropping, however, generally will induce a measurable disturbance in the photons in accordance with the Heisenberg uncertainty principle. Alice and Bob use the public channel to discuss and compare the photons sent through the quantum channel. If, through their discussion and comparison, they determine that there are no significant disturbances and, thus, sufficiently small evidence of eavesdropping, then the key material distributed via the quantum channel can be considered secret.

In some quantum cryptography schemes, it is desirable to form an authenticated association between the quantum channel, and the conventional communications channel between the communicating entities. Authentication can be important so that, for example, Alice can be sure she is communicating with Bob, and not with some malicious interloper. Similarly, Bob would like to be able to authenticate that he is truly communicating with Alice.

Thus, there is a need in the art for reliable authentication techniques that form an authenticated association between the optical channel and the conventional communication channel for quantum cryptographic sessions.

SUMMARY OF THE INVENTION

Techniques are disclosed herein for authenticating the quantum and public channels in a quantum cryptographic system.

One aspect consistent with the invention is directed to a method of authenticating an optical channel. The method includes modulating optical pulses corresponding to a first bit sequence based on a second bit sequence and transmitting the optical pulses over the optical channel. The method further includes receiving the modulated optical pulses, demodulating the received optical pulses using the second bit sequence, and authenticating the optical channel based on a number of bits from the first bit sequence that are correctly received and demodulated.

A second aspect of the invention is directed to a method that includes receiving optical pulses corresponding to a first bit sequence that were modulated based on a second bit sequence, the optical pulses being received over an optical channel. The method further includes demodulating the received optical pulses using the second bit sequence and authenticating the optical channel based on a number of bits from the first bit sequence that are correctly received and demodulated.

Another aspect of the invention is directed to a cryptographic device that includes a polarized pulse generator and a polarizing rotator. The polarized pulse generator emits optical pulses polarized in one of a first state and a second state based on values stored in a first bit sequence. The polarizing rotator rotates the optical pulses received from the polarized pulse generator by an angle specified by one or more bits from a second bit sequence to obtain a series of modulated optical pulses. The optical pulses are transmitted over an optical channel and used to authenticate the optical channel.

Another aspect of the invention is directed to a cryptographic device that includes a polarization rotator that rotates optical pulses received over an optical channel by an angle specified by one or more bits from a second bit sequence. The device further includes a polarizing beam splitter that receives the optical pulses rotated by the polarization rotator and a detector that generates indications of the polarizations of the received optical pulses. A counter tabulates a number of times the detector indicates that the received optical pulses are polarized in a state that matches a state of a corresponding bit in a first bit sequence. The optical channel is authenticated based on at least one count value of the counter.

Still further, another aspect of the invention is directed to a cryptographic device that includes phase setting logic configured to determine an initial phase based on values stored in a first bit sequence and summing logic configured to add the initial phase to a second phase determined based on one on or more bits from a second bit sequence and to output a summed phase angle. A phase modulator modulates optical pulses by the summed phase angle to obtain a series of modulated optical pulses. The modulated optical pulses are transmitted over an optical channel and used to authenticate the optical channel.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

A quantum cryptographic system is described below that enables authentication on both a public and an optical channel. The authentication can be tied to both channels so that both parties can be assured that a single authenticated entity is at the other end of both channels.

System Overview

Figure 1:
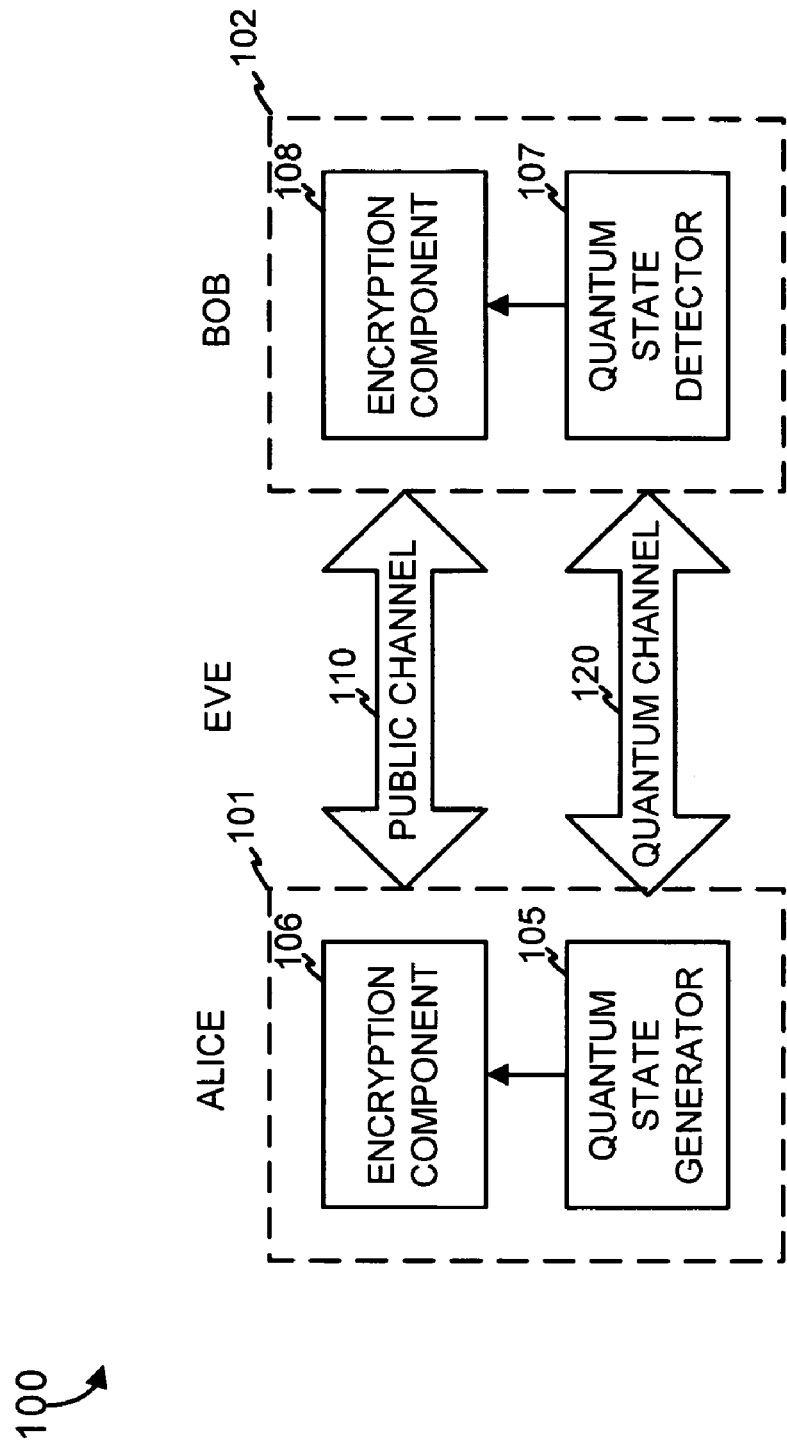
FIG. 1 is a diagram illustrating an optics-based cryptography system.

FIG. 1 is a high-level diagram illustrating an optics-based cryptography system 100. A sender 101 ("Alice") would like to send an encrypted message to a receiver 102 ("Bob"). Two channels may be used to send the message : a public channel 110 and an optical (quantum) channel 120. Public channel 110 may be any available communication medium between Alice and Bob, such as, for example, the Internet, a freespace optical or radio link, a public-switched telephone network, or a cellular or radio network. Quantum channel 120 may be a purely quantum channel that is used for dissemination of, and agreement upon, cryptographic key material. Quantum channel 120 may be implemented through, for example, lasers transmitting via either free space quantum links or through fiber optic cables.

In general, public channel 110 is a two-way channel in which messages, such as bit-streams in the form of packets, may be exchanged. Quantum channel 120 may be a one-way channel (not shown) or a two-way channel. As a one-way channel in either direction, Alice (or Bob) may prepare and modulate optical pulses, such as single photons, or a small number of photons, and transmit them to Bob (or Alice), who in turn detects the photons. As a two-way channel, one party may prepare a number of photons and the other party modulates, attenuates, and reflects the photons. The first party may then receive the reflected and attenuated result. In either situation, however, quantum channel 120 is distinct from public channel 110. Both the quantum and public channel may be susceptible to monitoring from a malicious third party, Eve.

In operation, sender (Alice) 101 may use a quantum state generator 105 to transmit a secret key to a quantum state detector 107 at receiver (Bob) 102. The key is transmitted over quantum channel 120 as a series of photons. The key may be negotiated between Alice and Bob using a standard quantum cryptography protocol such as the well-known BB84 protocol.

Quantum state generator 105 may be, for example, a faint laser source that emits photons. Alternatively it may be a true source of single photons. Quantum state detector 107 may be a detector designed to detect the emitted photons. Suitable quantum state generators 105 and quantum state detectors 107 are known in the art.

Once Alice and Bob have negotiated a secret key, they may both use the key to encrypt and decrypt messages sent over public channel 110. More specifically, Alice may encrypt/decrypt messages using encryption component 106. Bob may encrypt/decrypt messages using a corresponding encryption component 108.

Authentication

When communicating with cryptographic system 100, it is desirable that Alice and Bob are able to authenticate themselves with one another. In other words, Alice would like to be sure she is communicating with Bob and not a malicious interloper holding himself out as Bob. Similarly, Bob would like to be sure he is communicating with Alice. This authentication problem is further complicated because of the two distinct channels, public channel 110 and quantum channel 120, present in system 100. Thus, to obtain complete authentication, Alice would like to authenticate Bob on both quantum channel 120 and public channel 110. It may be the case, for instance, that Alice and Bob are talking to each other on public channel 110, but that an interloper has hijacked quantum channel 120 so that Alice's quantum pulses are in fact going to that interloper rather than Bob. The interloper may in turn send its own pulses on to Bob in place of Alice's original pulses.

Consistent with aspects of the invention, systems and methods are described that allow Alice and Bob to authenticate each other on multiple channels—both the public channel 110 and quantum channel 120. Each party may thus be assured that a single (authenticated)entity is at the other end of the channels.

Figure 2:
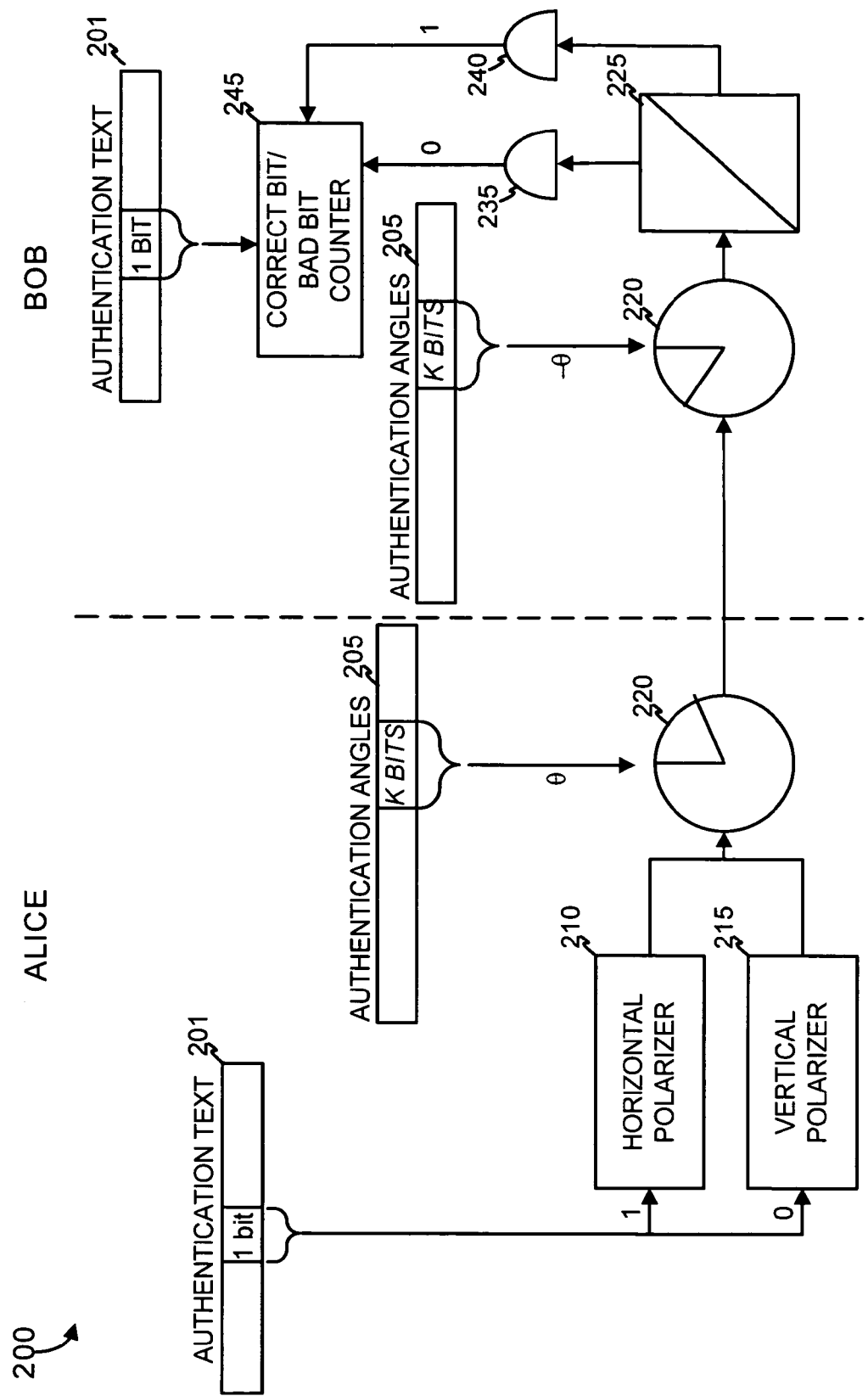
FIG. 2 is a diagram that conceptually illustrates an exemplary system for implementing authentication in a dual-channel quantum cryptographic system.

FIG. 2 is a diagram that conceptually illustrates an exemplary system 200 for implementing authentication in a dual-channel quantum cryptographic system. The quantum channel 120 in FIG. 2 is illustrated as being implemented using a polarization-based modulation scheme. The public channel is not explicitly shown in FIG. 2.

In system 200, Alice and Bob may each store authentication text 201 and authentication angles 205. Both Alice and Bob store the same authentication text 201 and authentication angles 205. Authentication text 201 may be a relatively lengthy sequence, such as a sequence of binary digits (i.e., ones or zeroes). Authentication angles 205 represents a sequence of angles that will be used to modulate each bit in authentication text 201. If K bits from authentication angles 205 are used to modulate each bit of authentication text 201, then the total length of the authentication angles 205 will be K times the length of authentication text 201. In one implementation, authentication text 201 and authentication angles 205 may simply be randomly generated sequences of bits that Alice and Bob have previously shared with one another via, for example, a trusted courier.

System 200 may use a polarization-based modulation scheme. Horizontal polarizer 210 and vertical polarizer 215 may emit horizontally and vertically polarized photon pulses, respectively. Horizontal polarizer 210 and vertical polarizer 215 may each include a laser diode designed to emit respective horizontally and vertically polarized pulses. Alternatively a single source may be polarized. Whether a horizontally polarized photon or a vertically polarized photon is to be emitted can be determined by the current bit in authentication text 201 (e.g., a one bit may indicate horizontal polarization and a zero bit may indicate vertical polarization).

The polarized photon may be input to polarization rotator 220, which rotates its input photon by an adjustable angle. In this implementation, the angle to rotate the photon is determined by the corresponding K bits from authentication angles 205. Suitable polarization rotators are known in the art and will not be described further herein. The polarized and rotated photon is then transmitted from Alice to Bob.

The receiving side of system 200 (Bob's side) complements the transmitting side (Alice's side) of system 200. In particular, this side may also include a polarization rotator 220, which rotates its received photon by the same adjustable angle supplied by Alice, but inverted, so as to undo the rotation supplied by Alice. The receiving side of system 200 may also include a polarizing beam splitter 225 and photon counting detectors 235 and 240. Polarizing beam splitter 225 directs an input photon into either counting detector 235 or counting detector 240 depending on the polarization (e.g., horizontal or vertical) of the photon. In this manner, counting detector 235 may receive a photon and generate an output signal when a vertically polarized photon is received by polarizing beam splitter 225 and counting detector 240 may receive a photon and generate an output signal when a horizontally polarized photon is received by polarizing beam splitter 225. Counter 245 may tabulate the signals generated by counting detectors 235 and 240.

Figure 3:
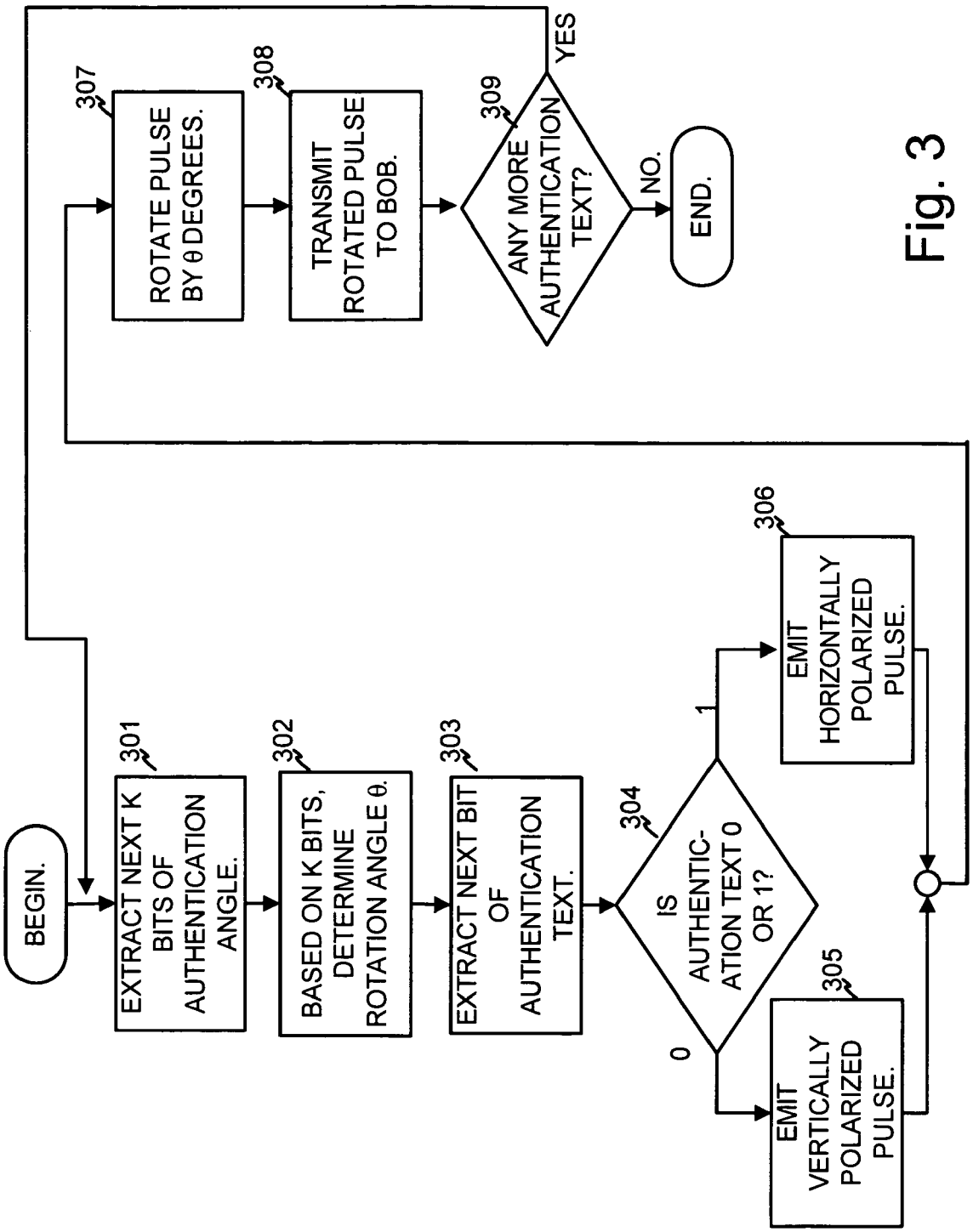
FIG. 3 is a flow chart illustrating operations consistent with the invention as performed at the transmitting side in the system shown in FIG. 2.

FIG. 3 is a flow chart illustrating operations consistent with the invention as performed at the transmitting side (Alice) in system 200. Alice may begin by extracting the first or next K bits from authentication angles 205 (act 301). Based on these K bits, Alice sets a rotation angle, θ, (act 302) for polarization rotator 220. The possible rotation angles can be any set of rotation angles that Alice and Bob have previously agreed upon and that are indexed by the K bits. For example, if K equals two, the rotation angles may be defined as 0 degrees when the two bits are 00, 90 degrees when the two bits are 01, 180 degrees when the two bits are 10, and 270 degrees when the two bits are 11.

Alice may also extract the next bit of the authentication text 201 (act 303). This bit of authentication text 201 may be used in conjunction with the authentication angle bits extracted in act 301. Depending on the value of the bit, Alice may emit either a vertically or horizontally polarized pulse (acts 304, 305, and 306). The polarized pulse is passed through polarization rotator 220 and transmitted (acts 307 and 308). Acts 301-308 may be repeated until all the authentication text is sent (act 309).

Figure 4:
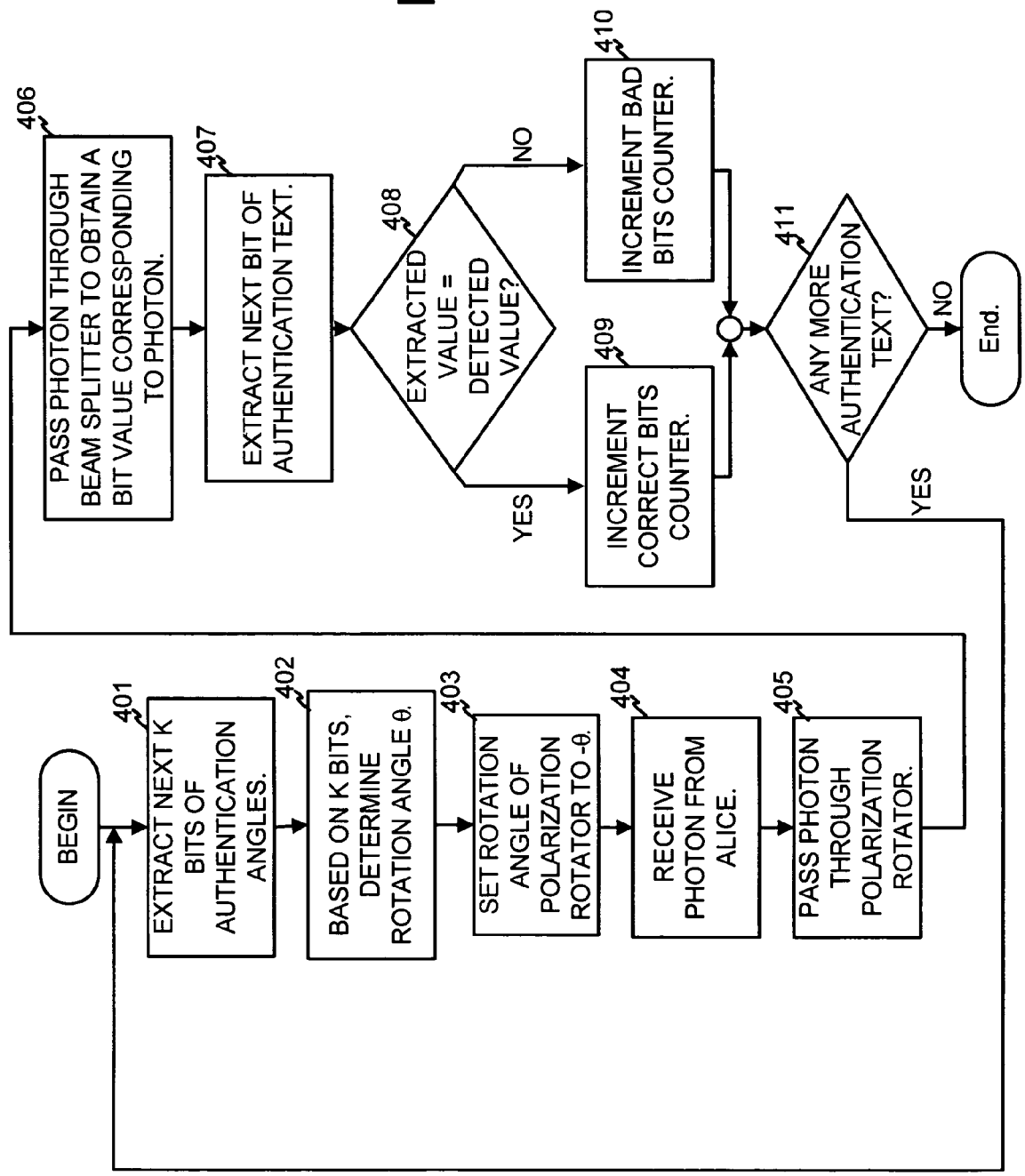
FIG. 4 is a flow chart illustrating operations consistent with the invention as performed at the receiving side in the system shown in FIG. 1.

FIG. 4 is a flow chart illustrating operations consistent with the invention as performed at the receiving side (Bob) in system 200. Bob extracts the next K bits from his copy of authentication angles 205 (act 401). Bob's K bits should be identical to the corresponding K bits extracted by Alice in act 301. From the K bits, Bob determines the appropriate angle θ using the same conventions used by Alice (act 402). Bob then sets the rotation angle of Bob's polarization rotator by negative θ, (act 403), to undue the rotation performed by Alice.

Bob may then receive a photon pulse from Alice (act 404). The photon passes through Bob's polarization rotator 220, (act 405), which brings the pulse back to the normal vertical or horizontal polarization. The pulse may then pass through polarizing beam splitter 225 (act 406), which then activates the appropriate detector 235 or 240.

Bob may extract the next bit from authentication text 201, (act 407), and compare the value of the bit to the value output from the activated detector (act 408). If the values are identical, counter 245 may increment a "Correct Bits" counter (act 409). If the values are not identical, counter 245 may increment a "Bad Bits" counter (act 410). In this manner, Bob keeps track of the number of correctly received and incorrectly received bits.

Bob may repeat acts 401-408 until all the authentication text information has been processed (act 411).

At the end of the operations shown in FIGS. 3 and 4, Alice will have prepared and sent all (or an agreed upon subset) of her authentication text 201, each bit of the authentication text being modulated by a rotation angle supplied from authentication angle information 205. Bob may detect some or all of these bits, again demodulated by an identical authentication angle sequence. In general, Bob may not detect all the photon pulses that Alice sends, because, for example, some of the pulses may get lost due to attenuation in the quantum channel, inefficiencies in Bob's detectors, etc. Also, some of the photons received by Bob may be interpreted incorrectly due to noise in the receiving side of system 200. However, at the end of the process, Bob will have a count of Correct Bits received and Bad Bits received.

Bob may then determine whether a sufficient number of Correct Bits have been received. One possible technique Bob can use is to compute the percentage of received bits that are correct as Correct Bits/(Correct Bits plus Bad Bits). If an adversary has interposed himself between Alice and Bob but does not known the authentication text 201 or the authentication angles 205, this percentage is likely to be appropriately 50%. If, however, Bob is indeed receiving the bits directly from Alice, on a perfect channel, this percentage should be 100%. However, if there is noise in the system, the percentage may be less than 100%. In one implementation, Bob may use a predetermined threshold for this percentage (e.g., 95%). If the percentage is greater than the percentage, Bob determines that he is indeed communicating with Alice. Bob may then inform Alice of his determination over public channel 110.

One of ordinary skill in the art will appreciate that additional techniques may be used to determine if the count of Correct Bits and Bad Bits warrants a determination that Bob is communicating with Alice. For example, Bob may additionally require that a certain number of bits be correctly received. Assume that Alice sends 1000 modulated pulses in a series, Bob may require that the percentage of correctly received bits be at least 95% and that at least 100 bits are received.

Figure 5:
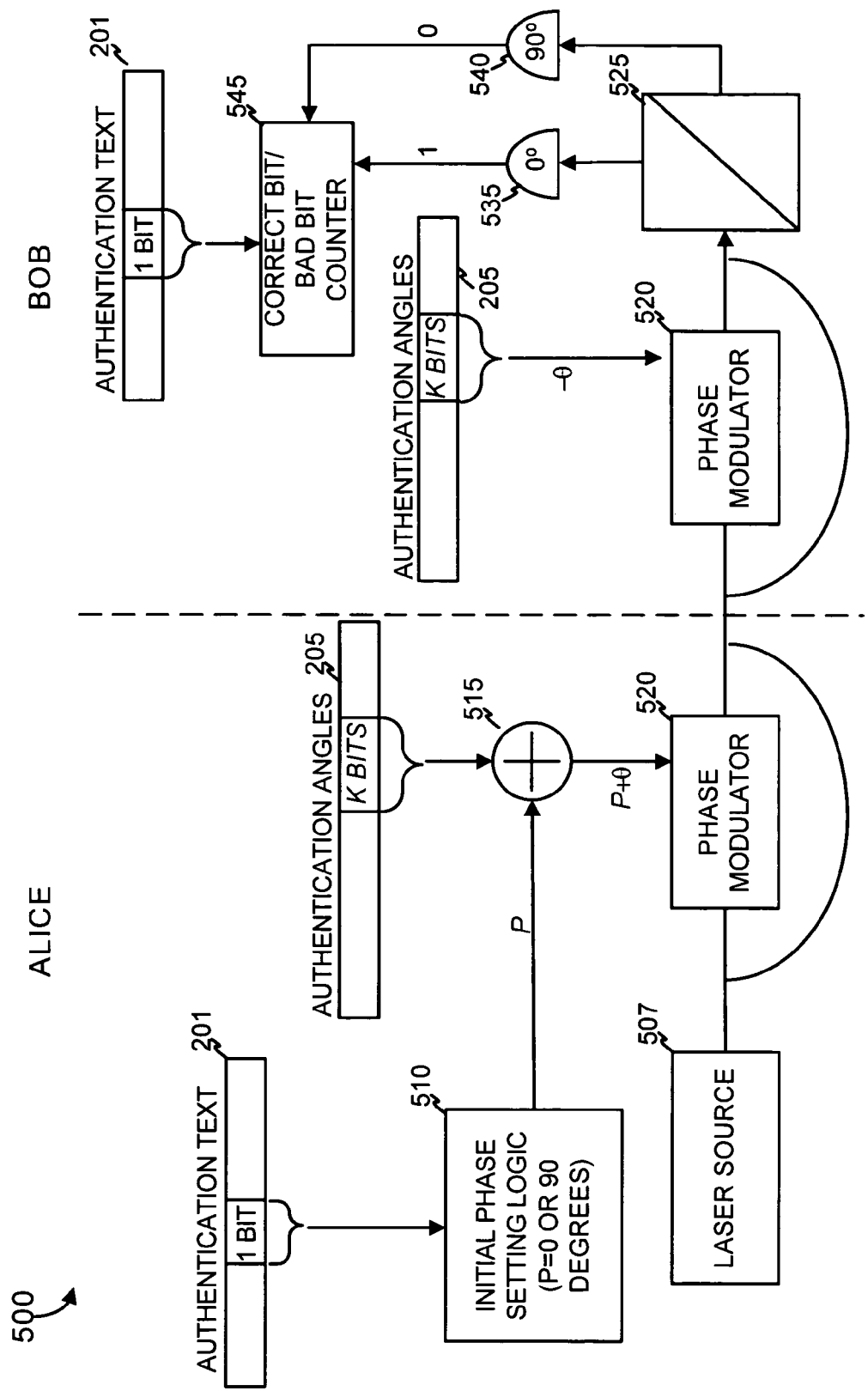
FIG. 5 is a diagram that conceptually illustrates an alternate exemplary system for implementing authentication in a dual-channel quantum cryptographic system.

FIG. 5 is a diagram that conceptually illustrates an alternate exemplary system 500 for implementing authentication in a dual-channel quantum cryptographic system. System 500 is similar to system 200, except that system 500 uses phase modulation instead of polarization modulation. In general, phase modulation may be preferable when the optical signal is transmitted though telecommunication fiber, which tends to scramble polarization, and polarization modulation may be preferable when the optical signal is transmitted through free space.

In system 500, Alice and Bob may each store the same authentication text 201 and authentication angles 205. A phase modulation 520, such as a modulator that includes unbalanced Mach-Zehnder interferometers, in which the modulation is applied via a phase modulator in one branch of the arm, may perform the phase modulation. The phase modulator 520 may be, for example, a conventional Lithium Niobate modulator or other known modulators.

Initial phase setting logic 510 determines an initial phase, P, to input to phase modulator 520. In one implementation, the initial phase may be 0 degrees if the bit from authentication text 201 is a one and 90 degrees if the bit from authentication text 201 is a zero. Summer 515 may add the angle P to an angle derived from the corresponding K bits from authentication angles 205 to obtain P', a final phase modulation value for phase modulator 520. K may be, for example, 10 bits long, allowing for 1,024 distinct values for $\theta$.

Laser source 507 may be a conventional laser source for use in quantum cryptography. Pulses from laser source 507 are input to phase modulator 520, which modulates the phase by P+$\theta$ degrees.

On the receiving side, a corresponding phase modulator 520 modulates the received pulses by negative $\theta$ degrees. A 50/50 (non polarizing) beam splitter 525 may receive the output of phase modulator 520. Phase modulator 520 directs an input pulse into either counting detector 535 or counting detector 540 depending on the phase (i.e., 90 degrees or 0 degrees) of the pulse. Counter 545 operates similarly to counter 245. That is, counter 545 increments a Correct Bits count or a Bad Bits count, depending on which counting detector is activated.

For clarity, authentication text 201 and authentication angles 205 have been described as distinct pieces of information. In some implementations, however, it may be useful to use a single bit sequence as source of both authentication text 201 and authentication angles 205.

Figure 6:
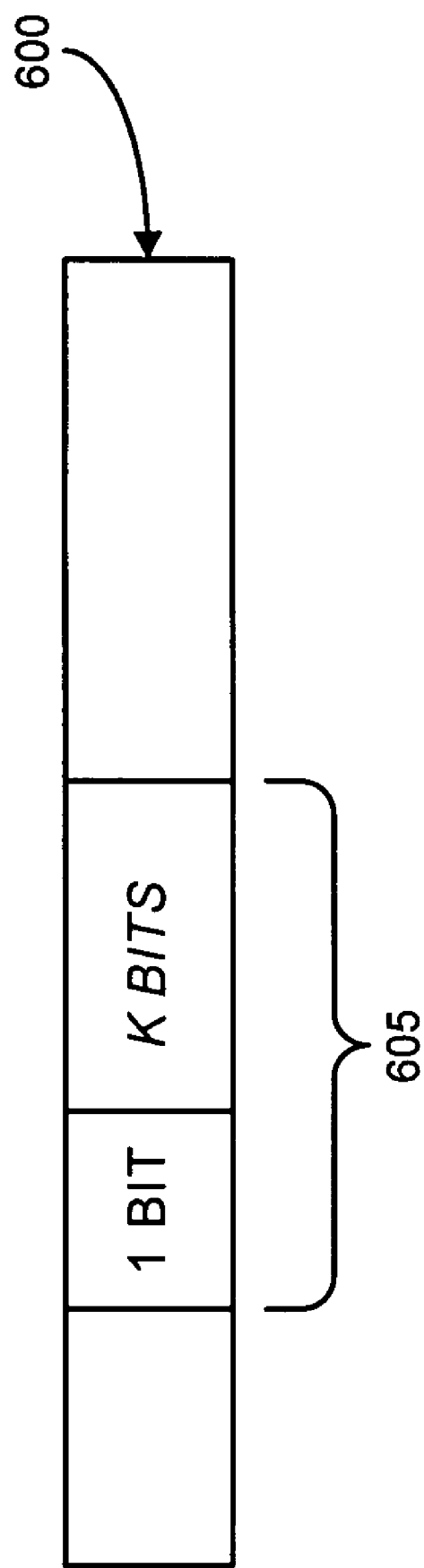
FIG. 6 is a diagram illustrating an exemplary implementation in which authentication text information and authentication angles are combined into a single bit sequence.

FIG. 6 is a diagram illustrating an exemplary implementation in which authentication text 201 and authentication angles 205 are combined into a single bit sequence. In this implementation, the authentication text 201 and the authentication angle 205 are interleaved in a single bit sequence 600. Single bit sequence 600 may include a number of repeated authentication text/authentication angle pairs in which each pair includes a bit of the authentication text 201 followed by the corresponding K bits of the authentication angles 205. In FIG. 6, a single pair 605 is illustrated.

One of ordinary skill in the art will recognize that other arrangements for combining the authentication text 201 and the authentication angles 205 are possible and may be used. For example, the authentication text may be the "leftmost" bits in the combined sequence, followed by a series of authentication angles that form the "rightmost" bits.

Other techniques than the one discussed above for mapping the K bits to the angle $\theta$ are also possible. In the technique given above, the entire range of angles may be evenly divided among the number of possible states that the K bits represent. In an alternate possible technique, K may be equal to one and the angle values may be assigned as zero degrees (bit value of zero) and 45 degrees (bit value of one). This is essentially a choice of one of two non-orthogonal bases for the authentication text bit to be transmitted. This technique may be advantageous because it makes it difficult for an eavesdropper to determine which basis was being used, and which value is being transmitted, with only a minimal number of bits for the authentication angles.

One of ordinary skill will also recognize that a single source may be employed for systems and devices based on polarization as well as those based on phase modulation as depicted in FIG. 5.

Authentication Protocols

Systems 200 and 500 (FIGS. 2 and 5) illustrate systems that modulate optical pulses that may be used to implement authentication schemes. A number of authentication protocols may be layered on top of systems 200 and 500, some of which will now be described.

One protocol for implementing authentication using systems 200 and 500 includes distributing the authentication text and authentication angles as shared secret keys. In this protocol, Alice and Bob agree, in a secure manner, on the authentication text and the authentication angles. They may agree, for example, by sharing the secret keys via a courier or by constructing the secret keys from an ongoing cryptographic process (e.g., by a quantum cryptographic process), or by a classical process such as the Diffie-Hellman algorithm A second protocol for implementing authentication using systems 200 and 500 may be based on secret authentication angles but known authentication text. The authentication text may be a publicly known series of bit values, such as a series of ones, and the authentication angles are shared between Alice and Bob as secret keys. In this implementation, Bob is simply checking whether quantum channel 120 is conveying the proper angle modulations.

Figure 7:
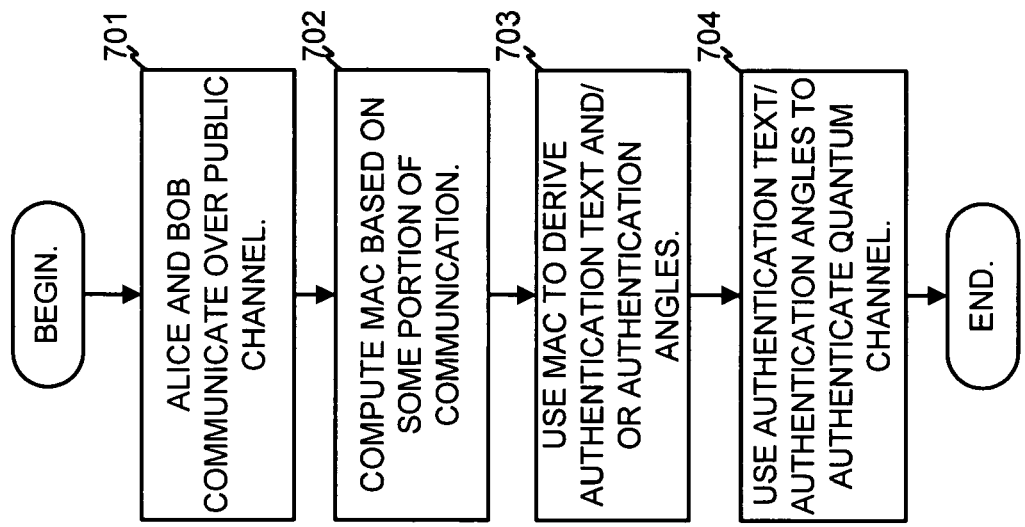
FIG. 7 is a flow chart illustrating operations performed consistent with the invention for implementing an authentication protocol that generates the authentication text and authentication angles post-facto.

Another possible authentication protocol using systems 200 and 500 is based on generating the authentication text and authentication angles post-facto, from data transmitted over public channel 110. FIG. 7 is a flow chart illustrating operations performed consistent with the invention for implementing this protocol.

Alice and Bob may begin by communicating over public channel 110 (act 701). The communication over public channel 110 may be encrypted using a symmetric key exchanged via quantum channel 120, as would be performed in a conventional quantum cryptographic system. A pre-designated block of the information communicated over the public channel, such as, for example, the first 1000 bytes of the communication, may then be used by both Alice and Bob to create a message authentication code (MAC) (act 702). The MAC may be generated by performing a cryptographic hash, such as the well known HMAC, SHA-1, or MD5 hash functions, on the block of information. Alternatively a universal hash function, or other information-theoretic hash, may be employed. Alice and Bob may then designate a portion of the MAC to form the authentication text and/or authentication angles (act 703). At this point, the derived authentication text and/or authentication angles may be used to authenticate quantum channel 120 using the techniques discussed above with reference to FIGS. 3 and 4 (act 704). In this manner, Alice and Bob can verify that the optical channel is indeed properly linked to the public message communication channel.

Figure 8:
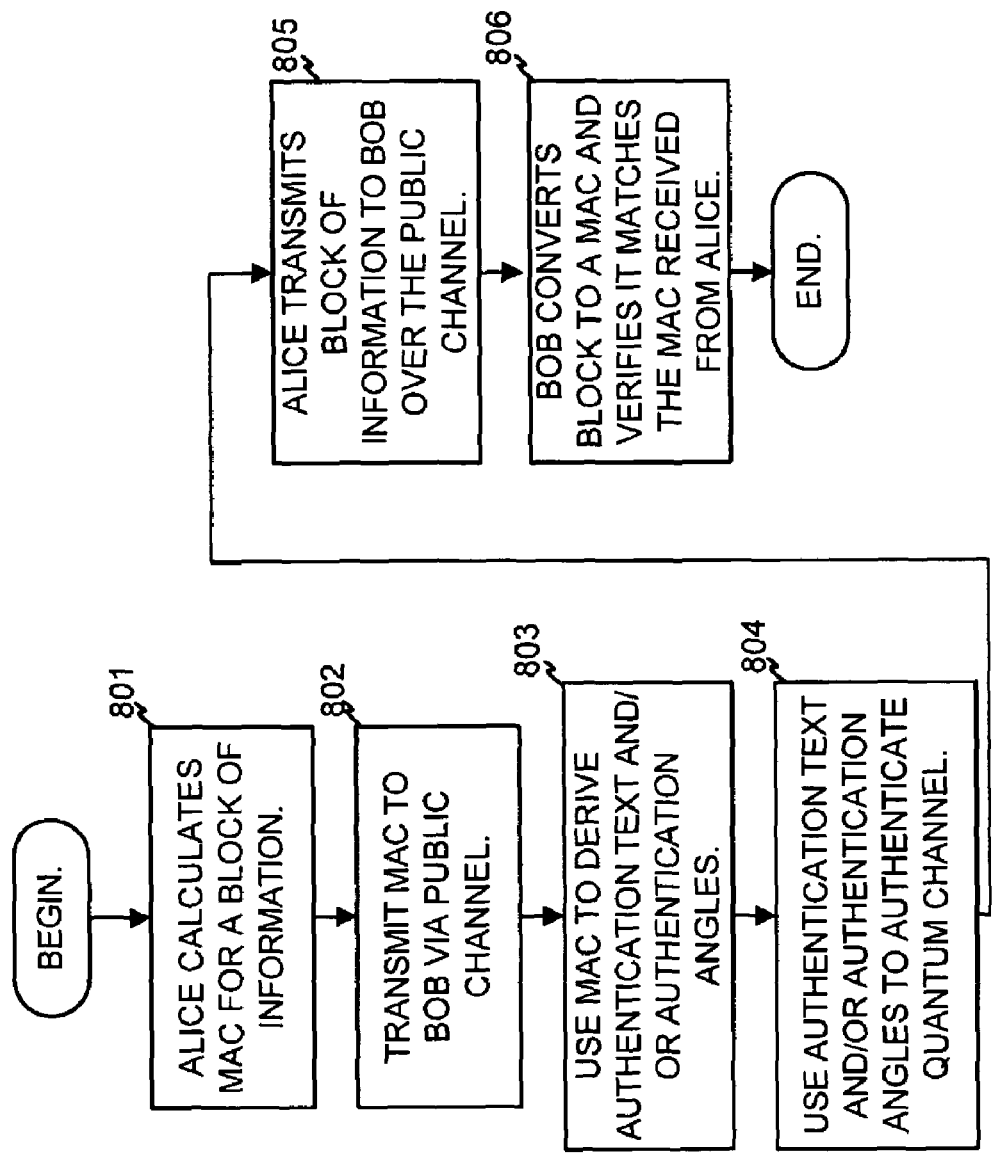
FIG. 8 is a flow chart illustrating operations performed consistent with the invention for implementing an authentication protocol that generates the authentication text and authentication angles pre-facto.

Another possible authentication protocol using systems 200 and 500 is based on generating authentication text and authentication angles pre-facto, from data transmitted over public channel 110. FIG. 8 is a flow chart illustrating operations performed consistent with the invention for implementing this protocol.

Alice may begin by creating a MAC for a block of information that she would like to communicate with Bob (act 801). Alice may then transmit the MAC to Bob via the public channel (act 802). Alice and Bob may use the portion of the MAC to form the authentication text and/or authentication angles (act 803). At this point, the derived authentication text and/or authentication angles may be used to authenticate quantum channel 120 using the techniques discussed above with reference to FIGS. 3 and 4 (act 804). Alice may then communicate the block of information to Bob via the public channel (act 805). Bob may then convert the block of information to a MAC, using the same technique that Alice used to initially generate the MAC, and verify that the newly converted MAC matches that MAC originally sent by Alice (act 806). In this manner, Alice and Bob can verify that the optical channel is properly linked to the public message communication channel.

Figure 9:
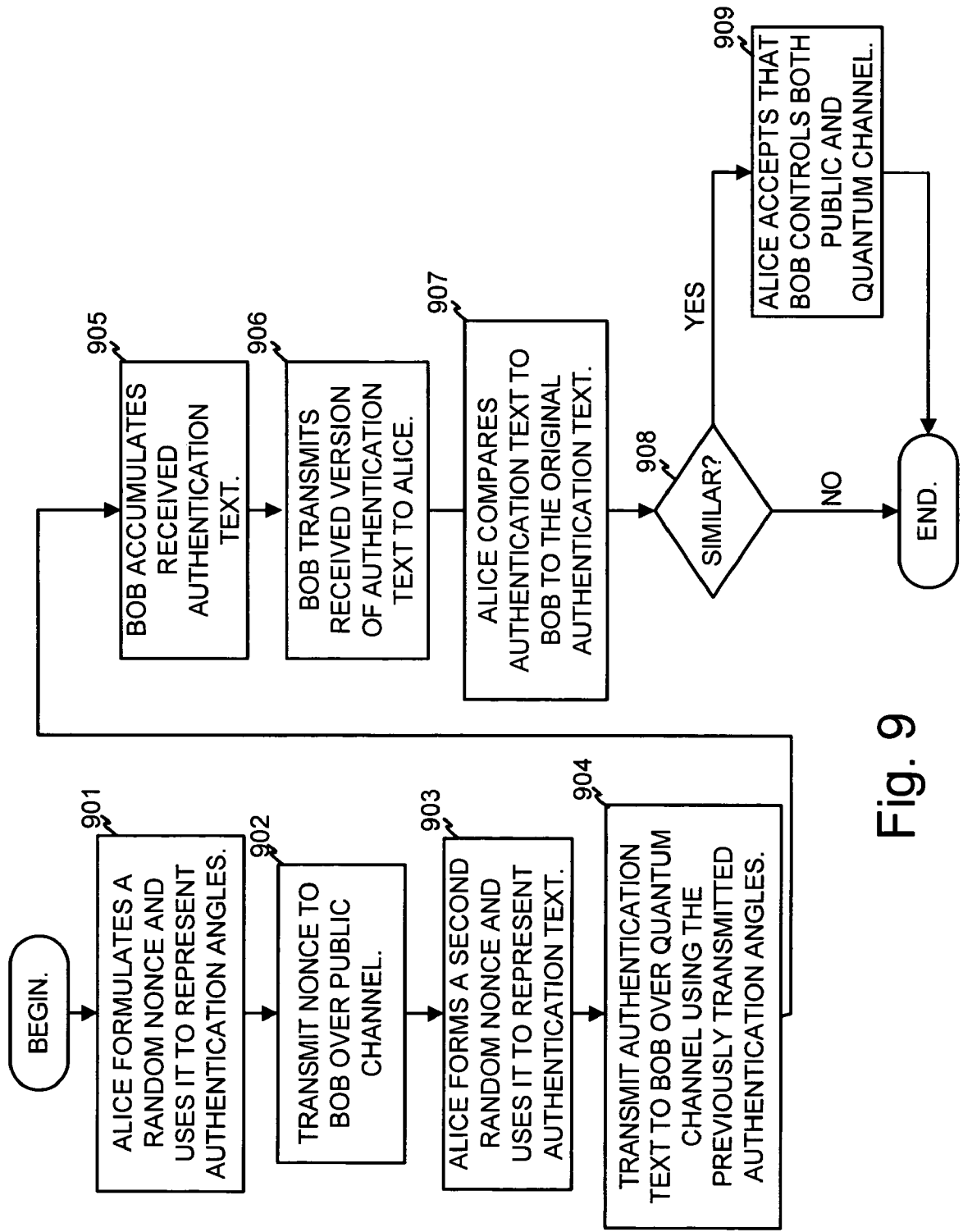
FIG. 9 is a flow chart illustrating operations performed consistent with the invention for implementing an authentication protocol based on a challenge-response initiated by Alice.

Another possible authentication protocol using systems 200 and 500 can be based on Alice initiating a challenge and response. FIG. 9 is a flow chart illustrating operations performed consistent with the invention for implementing this protocol.

Alice may begin by generating a random nonce (random sequence of 0 and 1 bits), which she will use to represent the authentication angles (act 901). Alice may then transmit the nonce to Bob over public channel 110 (act 902). Alice may also form a second random nonce, which she uses to represent the authentication text (act 903). Alice may then transmit the authentication text to Bob over quantum channel 120 using the authentication angles defined by the first nonce (act 904). Bob accumulates the received authentication text, (act 905), and then transmits the received authentication text back to Alice over public channel 110 (act 906). Alice may compare the version of the authentication text she received from Bob to the original version of the authentication text that she generated (act 907). If the two versions are similar, Alice may accept that Bob controls both the public and the quantum channel.

Figure 10:
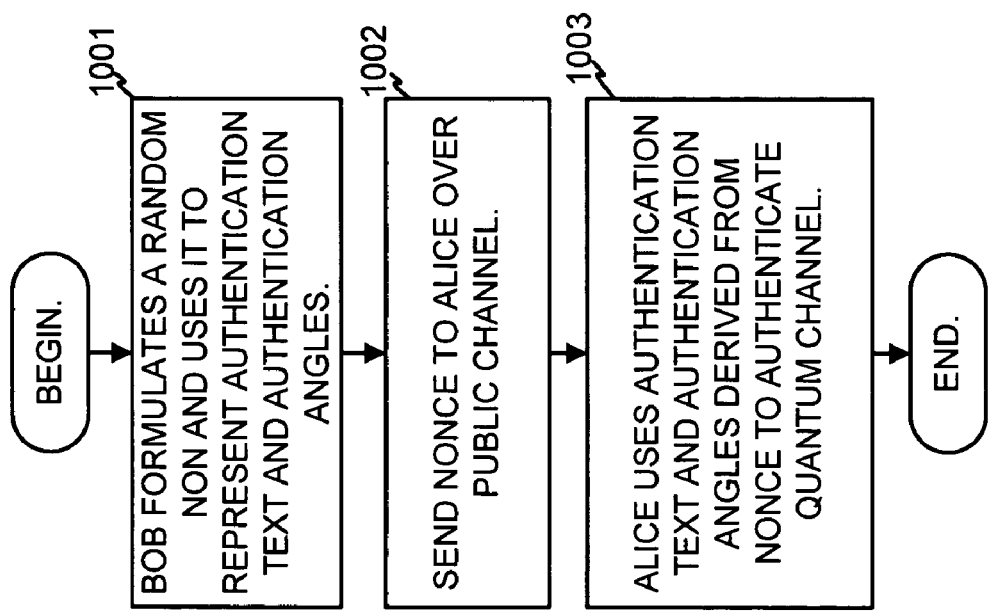
FIG. 10 is a flow chart illustrating operations performed consistent with the invention for implementing an authentication protocol based on a challenge-response initiated by Bob.

Another possible authentication protocol using systems 200 and 500 can be based on Bob initiating a challenge and response. FIG. 10 is a flow chart illustrating operations performed consistent with the invention for implementing this protocol.

Bob may begin by generating a random nonce that he uses to represent the authentication text and authentication angles (act 1001). Bob may send the nonce to Alice over public channel 110 (act 1002). Alice may then use the authentication text and the authentication angles derived from the nonce to authenticate quantum channel 120 using the techniques discussed above with reference to FIGS. 3 and 4 (act 1003).

One of ordinary skill in the art will recognize that the authentication protocols described above may additionally be "blended" such that multiple of these protocols can be combined or aspects of the multiple protocols can be combined.

Conclusion

The quantum cryptographic system described above enables authentication between parties participating in encrypted communications. A number of possible authentication protocols were also described that may be implemented using the physical system.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design or obtain software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the term "optical" has been used herein, at least with respect to quantum channel 120, this does not limit the frequency of electromagnetic energy used in the present invention to that of the human-visible spectrum. Frequencies of electromagnetic energy below infra-red and above ultra-violet may be used.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method of authenticating an optical channel comprising:
   modulating optical pulses corresponding to a first bit sequence based on a second bit sequence;
   transmitting the optical pulses over the optical channel;
   receiving the modulated optical pulses;
   demodulating the received optical pulses using the second bit sequence;

authenticating the optical channel based on a number of bits from the first bit sequence that are correctly received and demodulated;

calculating a message authentication code based on a block of text; and deriving the first and second bit sequences from the message authentication code.

2. The method of claim 1, wherein every bit in the first bit sequence is identical.

3. The method of claim 1, wherein the first bit sequence is a pseudo-random bit sequence.

4. The method of claim 1, wherein the second bit sequence is a pseudo-random bit sequence.

5. The method of claim 1, wherein the optical pulses are modulated using polarization modulation.

6. The method of claim 5, wherein each bit of the first bit sequence specifies one of two possible polarizations to apply to the optical pulses.

7. The method of claim 5, wherein each K bits of the second bit sequence, where K is a positive integer, specifies a polarization to apply to the optical pulses.

8. The method of claim 6, wherein each bit of the first bit sequence specifies either a vertical or horizontal polarization.

9. The method of claim 1, wherein the optical pulses are modulated using phase modulation.

10. The method of claim 9, wherein each bit of the first bit sequence specifies one of two possible phases to shift the optical pulses.

11. The method of claim 9, wherein each K bits of the second bit sequence, where K is a positive integer, specifies a phase to shift the optical pulses.

12. The method of claim 1, wherein authenticating the optical channel includes:

tabulating the number of bits from the first bit sequence that are correctly received;

tabulating the number of bits from the first bit sequence that are incorrectly received; and authenticating the optical channel when the tabulated number of correctly received bits expressed as a fraction of a total number of correctly and incorrectly received bits is greater than a threshold value.

13. The method of claim 1, wherein the first bit sequence and the second bit sequence are derived from shared secret keys.

14. The method of claim 1, wherein the second bit sequence is distributed as a shared secret key and the first bit sequence is distributed as a known sequence.

15. The method of claim 1, further comprising:

computing a message authentication code based on communications over a public channel; and deriving at least one of the first and second bit sequences based on the message authentication code.

16. The method of claim 1, further comprising:

sharing the second bit sequence over a public channel, wherein authenticating the optical channel further includes transmitting a representation of the demodulated and received optical pulses to an entity that transmitted the optical pulses over the optical channel, and comparing the first bit sequence to the representation of the demodulated and received optical pulses.

17. A method comprising:

calculating a message authentication code based on a block of text;

deriving first and second bit sequences from the message authentication code;

receiving optical pulses corresponding to the first bit sequence that were modulated based on the second bit sequence, the optical pulses being received over an optical channel;

demodulating the received optical pulses using the second bit sequence; and authenticating the optical channel based on a number of bits from the first bit sequence that are correctly received and demodulated.

18. The method of claim 17, wherein the optical pulses are modulated using polarization modulation.

19. The method of claim 18, wherein each bit of the first bit sequence specifies either a vertical or horizontal polarization.

20. The method of claim 17, wherein the optical pulses are modulated using phase modulation.

21. The method of claim 17, wherein the first bit sequence and the second bit sequence are distributed as shared secret keys.

22. The method of claim 17, wherein the second bit sequence is distributed as a shared secret key and the first bit sequence is a known sequence.

23. The method of claim 17, further comprising:

computing a message authentication code based on communications over a public channel; and deriving at least one of the first and second bit sequences based on the message authentication code.

24. A cryptographic device comprising:

a polarized pulse generator configured to emit optical pulses polarized in one of a first state and a second state based on values stored in a first bit sequence; and a polarizing rotator configured to rotate the optical pulses received from the polarized pulse generator by an angle specified by one or more bits from a second bit sequence to obtain a series of modulated optical pulses, wherein the optical pulses are transmitted over an optical channel and used to authenticate the optical channel, and wherein the first and second bit sequences are derived from a calculated message authentication code, the calculation based on a block of text.

25. The device of claim 24, wherein the polarized pulse generator further comprises:

a first laser configured to emit a horizontally polarized optical pulse when a bit in the first bit sequence specifies the first state; and a second laser configured to emit a vertically polarized optical pulse when the bit in the first bit sequence specifies the second state.

26. The device of claim 24, wherein each bit of the first bit sequence specifies either a vertical or horizontal polarization.

27. The device of claim 24, wherein the first bit sequence and the second bit sequence are distributed as shared secret keys.

28. The device of claim 24, wherein the second bit sequence is distributed as a shared secret key and the first bit sequence is distributed as a known sequence.

29. The device of claim 24, further comprising:

computing a message authentication code based on communications over a public channel; and deriving at least one of the first and second bit sequences based on the message authentication code.

30. A cryptographic device comprising:

a polarization rotator configured to rotate optical pulses received over an optical channel by an angle specified by one or more bits from a second bit sequence; and a polarizing beam splitter configured to receive the optical pulses rotated by the polarization rotator;

a detector configured to generate indications of the polarizations of the received optical pulses; and a counter configured to tabulate a number of times the detector indicates that the received optical pulses are polarized in a state that matches a state of a corresponding bit in a first bit sequence, wherein the optical channel is authenticated based on at least one count value of the counter, and wherein the first and second bit sequences are derived from a calculated message authentication code, the calculation based on a block of text.

31. The device of claim 30, wherein the counter is further configured to tabulate a number of times the detector indicates that the received optical pulses are polarized in a state that does not match the state of the corresponding bit in the first bit sequence.

32. The device of claim 30, wherein each bit of the first bit sequence specifies either a vertical or horizontal polarization.

33. The device of claim 30, wherein the first bit sequence and the second bit sequence are distributed as shared secret keys.

34. The device of claim 30, wherein the second bit sequence is distributed as a shared secret key and the first bit sequence is distributed as a known sequence.

35. The device of claim 30, further comprising:

computing a message authentication code based on communications over a public channel; and deriving at least one of the first and second bit sequences based on the message authenticating code.

36. A cryptographic device comprising:

phase setting logic configured to determine an initial phase based on values stored in a first bit sequence;

summing logic configured to add the initial phase to a second phase determined based on one on or more bits from a second bit sequence and to output a summed phase angle; and a phase modulator configured to modulate optical pulses by the summed phase angle to obtain a series of modulated optical pulses, wherein the modulated optical pulses are transmitted over an optical channel and used to authenticate the optical channel, and wherein the first and second bit sequences are derived from a calculated message authentication code, the calculation based on a block of text.

37. The device of claim 36, further comprising:

a photon source configured to generate the optical pulses.

38. The device of claim 36, wherein the first bit sequence and the second bit sequence are distributed as shared secret keys.

39. The device of claim 36, wherein the second bit sequence is distributed as a shared secret key and the first bit sequence is distributed as a known sequence.

40. The device of claim 36, further comprising:

logic configured to compute a message authentication code based on communications over a public channel; and logic configured to derive at least one of the first and second bit sequences based on the message authentication code.

41. A device comprising:

means for calculating a message authentication code based on a block of text;

means for deriving first and second bit sequences from the message authentication code;

means for receiving optical pulses corresponding to the first bit sequence that were modulated based on the second bit sequence, the optical pulses being received over an optical channel;

means for demodulating the received optical pulses using the second bit sequence; and means for authenticating the optical channel based on a number of bits from the first bit sequence that are correctly received and demodulated.

* * * * *